US008944209B1

(12) United States Patent
Fields

(10) Patent No.: US 8,944,209 B1
(45) Date of Patent: Feb. 3, 2015

(54) SMART DEVICE SOUND AMPLIFIER

(71) Applicant: Ty Fields, Truckee, CA (US)

(72) Inventor: Ty Fields, Truckee, CA (US)

( * ) Notice: Subject to any disclaimer, the term of this patent is extended or adjusted under 35 U.S.C. 154(b) by 0 days.

(21) Appl. No.: 14/133,353

(22) Filed: Dec. 18, 2013

Related U.S. Application Data

(60) Provisional application No. 61/738,514, filed on Dec. 18, 2012.

(51) Int. Cl.
*G10K 11/00* (2006.01)

(52) U.S. Cl.
USPC .......................... 181/178; 181/175; 455/575.1

(58) Field of Classification Search
CPC .................................. G10K 11/08; H04M 1/23
USPC ................. 181/175, 178; 455/575.1
See application file for complete search history.

(56) References Cited

U.S. PATENT DOCUMENTS

| 1,029,502 | A | * | 6/1912 | Landon | 181/178 |
| 2,012,538 | A | * | 8/1935 | Krohn | 181/178 |
| 5,967,875 | A | * | 10/1999 | Graef | 446/74 |
| 7,984,842 | B2 | * | 7/2011 | Richie | 229/103 |
| 8,256,568 | B2 | * | 9/2012 | Lin | 181/179 |
| 8,327,974 | B1 | * | 12/2012 | Smith et al. | 181/175 |
| 8,412,289 | B1 | * | 4/2013 | Oh | 455/575.1 |
| 8,433,377 | B1 | * | 4/2013 | Oh et al. | 455/575.1 |
| 8,522,917 | B1 | * | 9/2013 | Oh et al. | 181/192 |
| 8,616,327 | B1 | * | 12/2013 | Palacios | 181/175 |
| RE44,942 | E | * | 6/2014 | Lee et al. | 455/575.1 |
| 2002/0009195 | A1 | * | 1/2002 | Schon | 379/454 |
| 2010/0219012 | A1 | * | 9/2010 | Baumbach | 181/177 |

* cited by examiner

*Primary Examiner* — Forrest M Phillips
(74) *Attorney, Agent, or Firm* — Heisler & Associates

(57) ABSTRACT

A sound amplifier is provided in the form of a sound amplification cone with a front panel opposite a rear panel and spaced apart by side panels. The side panels fold so that the front panel and rear panel can collapse together or be deployed apart. The sound amplification cone is hinged to a tab which is held at least partially within a case. The case also holds a smart device therein. A slot in the case allows for the tab and sound amplification cone to slide into and out of the case when the cone is collapsed. When the sound amplification cone is slid out of the case and deployed, a port of the sound amplification cone is located adjacent speakers of the smart device to amplify sound therefrom. Auxiliary speakers and a power source can also be provided within the tab or sound amplification cone for further sound amplification.

20 Claims, 5 Drawing Sheets

SMART DEVICE SOUND AMPLIFIER

CROSS-REFERENCE TO RELATED APPLICATIONS

This application claims benefit under Title 35, United States Code §119(e) of U.S. Provisional Application No. 61/738,514 filed on Dec. 18, 2012.

FIELD OF THE INVENTION

The following invention relates to accessories for smart phones and other smart devices, such as MP3 players and tablet computing devices. More particularly, this invention relates to accessories for smart devices which are configured to amplify sound provided by the smart device.

BACKGROUND OF THE INVENTION

Portable electronic devices which can play sound come in a variety of different configurations. With the state of the art advancing beyond removable sound storing media such as cassette tapes and CD players, to solid state or hard disk containing devices (with sound containing media in the form of digital files stores on memory within the device itself rather than upon removable media), the shapes of such devices have changed somewhat. Many such devices generally tend to have at least one dimension which is quite thin and less than twenty-five percent of the extent of the other dimensions. Such devices typically are orthorhombic in shape with three pairs of opposing parallel sides. A thinest dimension generally extends between a front and a back of such a device. A four sided perimeter edge is presented between the front and back which is quite thin with two shorter sides referred to as ends and two longer sides referred to as lateral sides.

Examples of such electronic sound playing devices include MP3 players (e.g. iPods from Apple, Inc.) and smartphones (e.g. iPhones from Apple, Inc.), as well as tablet devices (e.g. iPads from Apple, Inc.). Collectively, such devices are referred to herein as "smart devices" for convenience. While the dimensions of such devices vary, they still generally have this orthorhombic shape with a thinnest dimension between a front and a back.

When such devices are playing sound, the sound can be enjoyed generally in two ways. First, a headphone jack is typically provided to which headphones or earbuds can be attached for sound enjoyment. Secondarily, such devices typically have a speaker from which sound can emanate to fill a space adjacent the device. This speaker is typically provided on the lower end of the device.

Generally, the speakers on such devices are deficient in at least two ways. First, because the power of such devices is limited to what can be stored on a battery contained therein, the amount of sound amplification is limited. Second, because the speakers do not have a geometry optimized for high quality sound, the sound tends to have a low quality and volume.

A variety of ad hoc solutions to this problem are known in the prior art. For instance, it is known to merely place a smartphone within a bowl and to have improved sound emanate therefrom, improved in both volume and tonal quality. However, such a solution is only useful when a bowl is available for such use, as it is not convenient to carry a bowl with the sound generating device for sound amplification. Accordingly, a need exists for a sound amplifier for a smart device which can conveniently be carried with the device itself and to be readily deployed and re-collapsed when desired.

SUMMARY OF THE INVENTION

With this invention a sound amplifier is provided for a smart device. In a preferred embodiment a sound amplifier is configured to be attachable to a case and deployed out of the case for use in amplifying sound, or collapsed and stored within the case when not in use. The case is configured to hold the smart device therein. The case has side walls extending up from a floor to a rim. Dimensions of the case are such that the smart device fits snugly inside the case. Typically, the case is formed of a somewhat resilient material to cause the case to securely hold to the smart device. An insert structure is provided which in a preferred embodiment includes a tab and a sound amplifying cone.

In this embodiment the tab remains at least partially within the case while the cone can slide through a slot out of the case and pivot about a hinge between the cone and the tab. The cone has a tapering form between a port adjacent the smart device within the case and an outlet opposite the port. Sound is thus amplified as it passes through the cone.

The cone is configured to have a deployed form and a collapsed form. In one embodiment the cone has front and rear panels which are adjacent each other when the cone is in the collapsed form but spaced from each other when the cone is in the deployed form. Side panels join the front and rear panels together with the side panels preferably collapsible by having a crease down a middle thereof so that the side panels can transition between a folded over form bringing the front and rear panels together and an extended form where the side panels space the front and rear panels away from each other.

The case is sized sufficiently large so that the tab and cone of the insert can slide through the slot in the case and entirely into the case above the floor and still provide room within the case for the smart device.

Auxiliary speakers can optionally be provided, such as within the tab to add further sound amplification to sound from the smart device. A battery is optionally provided within the tab or elsewhere associated with the case. Wiring and electronic circuitry is provided between the battery and the speakers so that the speakers can be powered. A signal can be provided to the speakers either through a wire or wirelessly, such as through use of the Bluetooth wireless transmission protocol, by transmission from the smart device to a receiver within the circuitry associated with the battery and speakers. A power port is also optionally provided for recharging of the battery associated with the amplifier.

OBJECTS OF THE INVENTION

Accordingly, a primary object of the present invention is to provide a sound amplifier for a smart device which has a hollow tapering form to provide natural sound amplification.

Another object of the present invention is to provide a sound amplifier for a smart device which can fit within a case of the smart device and be stored in a collapsed form inside the case or deployed out of the case for use in amplifying sound.

Another object of the present invention is to provide a sound amplification method to amplify sound from a smart device to improve enjoyment of sound from the smart device.

Another object of the present invention is to provide an amplifier for a smart device which is easy to attach to a smart device and which is readily configurable between a deployed form and a collapsed form.

Another object of the present invention is to provide a smart device sound amplifier which can be provided in various different sizes to work with smart devices of different types.

Other further objects of the present invention will become apparent from a careful reading of the included drawing figures, the claims and detailed description of the invention.

DESCRIPTION OF THE PREFERRED EMBODIMENT

Figure 1:
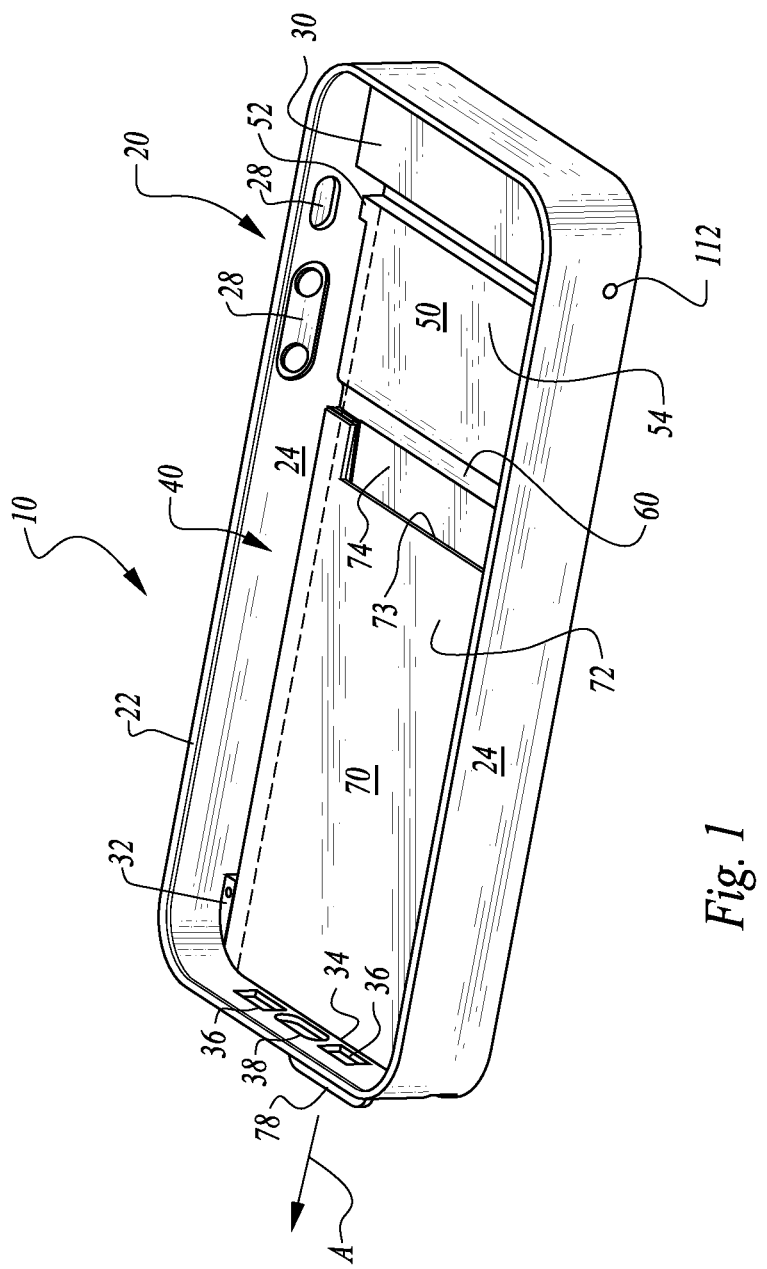
FIG. 1 is a perspective view of a sound amplifier assembly of this invention including a case and an insert within the case which includes a sound amplifying cone, with the sound amplifying cone shown stored within the case.

Referring to the drawings, wherein like reference numerals represent like parts throughout the various drawing figures, reference numeral 10 is directed to an assembly for providing sound amplification for a smart device S (FIG. 4) according to a preferred embodiment of this invention. In this embodiment, the assembly 10 includes a case 20 for the smart device S, such as a smartphone, as well as an insert 40 deployable out of the case 20, so that the insert 40 can be reconfigured between a collapsed form and a deployed form. The insert 40 includes a sound amplification cone 70 which can be placed adjacent speakers of the smart device S to amplify sound from the smart device S.

Figure 4:
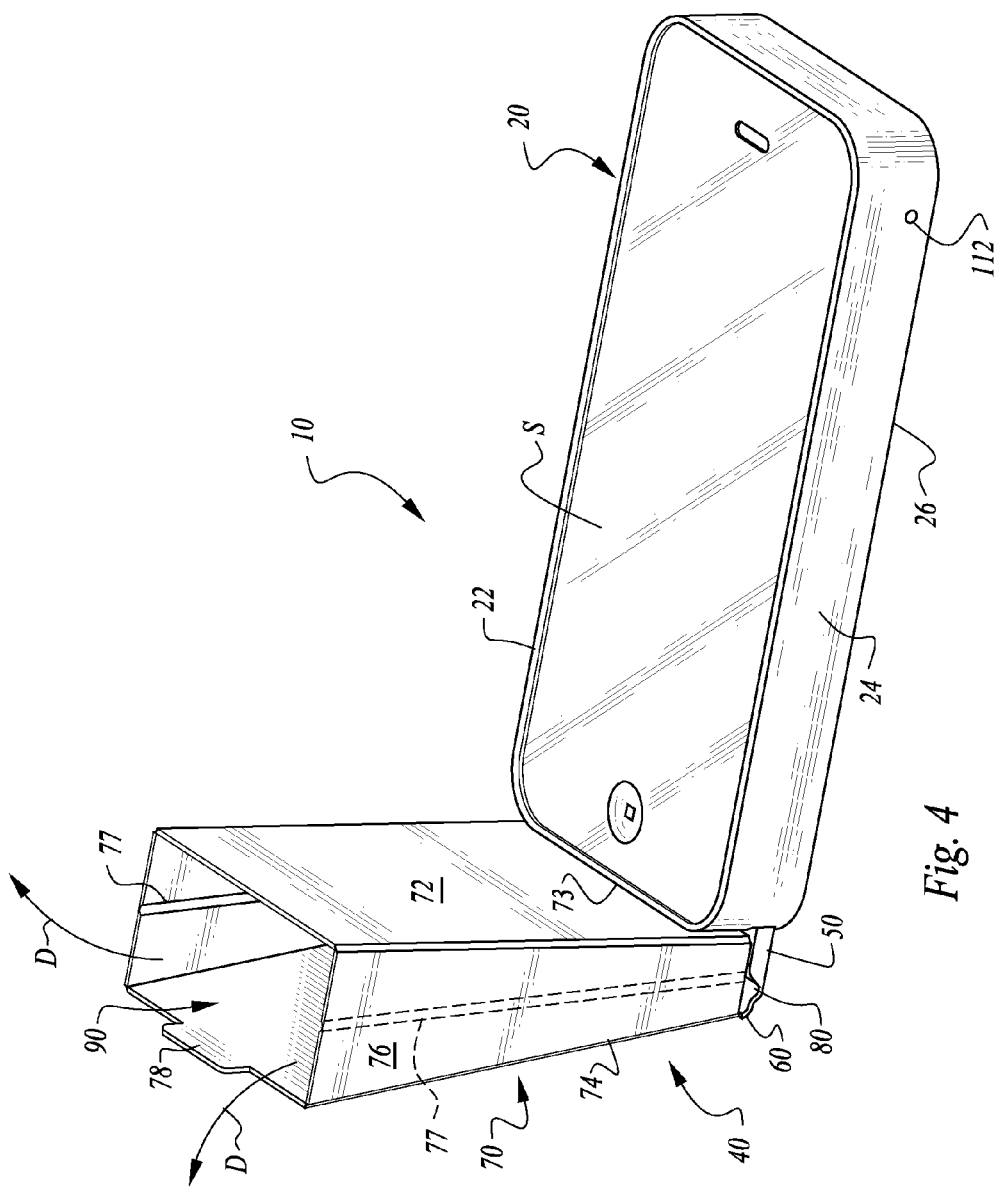
FIG. 4 is a perspective view similar to that which is shown in FIG. 3 but after rotation of the sound amplification cone to one final use position adjacent to an end of the smart device and case, for amplifying sound emanating from the smart device, and with a smart phone shown installed within the case portion of the assembly.

In essence, and with particular reference to FIG. 4, basic details of the assembly 10 are described, according to this preferred embodiment. The assembly 10 includes the case 20 for a smart device S and the insert 40 movable relative to the case 20 and storable within the case 20. The case 20 is sized to hold a smart device S therein, such as a smartphone. The insert 40 includes a tab 50 hinged through a hinge 60 to a sound amplification cone 70. When in a collapsed form, the tab 50 and cone 70 lie flat and can sit within a portion of the case 20 along with the smart device S. The cone 70 can be reconfigured between a collapsed form and a deployed form. When deployed, the cone 70 extends between a port 80 and an outlet 90. The port 80 can be placed adjacent speakers of the smart device S for sound to be inputted into the sound amplification cone 70. The outlet 90 is larger than the port 80 and thus emits amplified sound out of the sound amplification cone 70.

Additionally, speakers 100 (FIGS. 3 and 5) can be provided within the tab 50 or otherwise within some portion of the insert 40 to add further sound into the sound amplification cone 70. These speakers 100 can be coupled to circuitry including a battery 110 to supply power to the speakers 100, and can also receive a signal either through a wire coupled to the smart device S or through a wireless transmission such as utilizing a wireless radio transmission protocol (e.g. bluetooth) to provide an audio signal to the speakers 100 from the smart device S. Optionally, a second battery 120 can also be provided within the case 20 (FIG. 5) to provide further power for the speakers 100 or to otherwise provide additional power for powering the smart device S.

Figure 2:
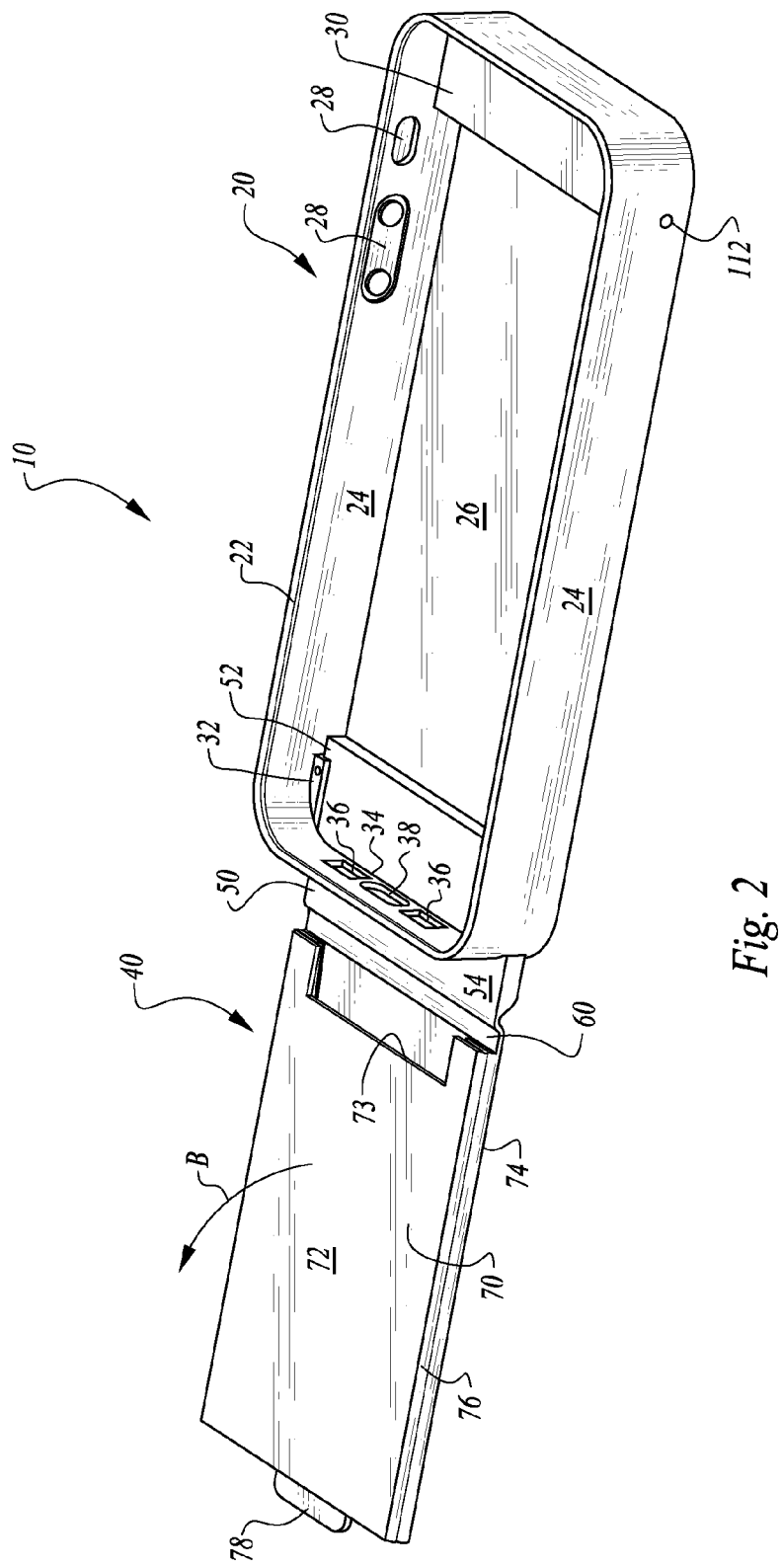
FIG. 2 is a perspective view similar to FIG. 1 but after an insert of the assembly including a sound amplifying cone and tab have been extended out of a slot in the case, ready for deployment of the sound amplifying cone.

More specifically, and with particular reference to FIGS. 1 and 2, details of the case 20 of the assembly 10 are described, according to this preferred embodiment. The case 20 is similar to many prior art smart device cases except that it is deeper to accommodate storage of the insert 40 when in a collapsed orientation. This added depth is approximately thirty to forty percent of the height of the case 20. The case 20 includes sides 24 extending perpendicularly up from a floor 26 to a rim 22. The sides 24 include long lateral sides and short end sides so that lateral end sides of the smart device are covered by the sides 24 of the case 20.

The rim 22 typically has a small lip extending inwardly to help secure the case 20 upon the smart device. A face of the smart device is accessible inboard of this rim 22. In some instances, a protective layer over the face of the smart device is associated with the case 20 and spanning between the rims 22 of the sides 24. Other details common with many smartphone cases 20 include control ports 28 so that buttons on a side of the smart device S can be accessed through the case 20.

Furthermore, sound ports 36 and a connection port 38 are typically provided at one of the ends of the case 20, generally aligned with speakers of the smart device S, and a connection interface of the smart device S. The connection interface allows for interconnection of various devices to the smart device and specifically also acts as a recharging port and data transfer port. The case 20 is typically formed of a somewhat resilient material so that it protects the smart device somewhat from shocks and also can stretch somewhat to snap onto the smart device S and be held securely to the smart device S.

Because the insert 40 is typically not as long as a longest dimension of the smart device, a shelf 30 is provided at an end of the case 20 opposite the sound ports 36 and communication port 38. A second battery 120 can optionally be provided inside of this shelf 30. Also, a power port 112 can pass through the case 20 and access space within this shelf 30 such as to supply power to this second battery 120 and so that battery power within the case 20 itself can be maintained. In one embodiment this second battery 120 is configured to be coupleable to a battery within the smart device, such as through the connection port 38 by placing appropriate wiring inboard of the case 20 or by running a power cord from the power port 112 to the connection port 38. In this way, additional power, such as emergency backup power, can be provided within the case 20 to provide power to the smart device S should it be running low on power.

The end side of the case 20 having the sound ports 36 and connection port 38 therein preferably also includes a slot 34 located adjacent the floor 26. This slot 34 is substantially as wide as the entire case 20 and has a height slightly less than half of a height of the case 20. This slot 34 allows for sliding of the insert 40 out of the case 20 and back into the case 20. A height of this slot 34 is similar to a height of the insert 40 when in its collapsed form.

A stop 32 is provided adjacent this slot 34. Preferably, this stop 32 includes two separate halves on lateral sides of the slot 34 and adjacent the sides 24 of the case 20. This stop 32 interacts with the tab 50 of the insert 40 to keep the tab 50 at least partially within the case 20 when the insert 40 is deployed (along arrow A of FIG. 1) out of the case 20. This stop 32 is only provided within a lower portion of the case 20 so that the smart device can overlie this stop 32. The stop 32 thus also acts along with the shelf 30 to keep the smart device S from inadvertently extending down into lower portions of the case 20 and interfering with sliding of the insert 40 back into the case 20. While only one stop 32 is shown and one side of the slot 34 because of the perspective of FIGS. 1 and 2, it is understood that a second similar stop 32 is provided on a near side of FIGS. 1 and 2 that is a mirror image of the stop 32 shown in FIGS. 1 and 2.

While the case 20 is shown with a particular configuration described herein, the case 20 would be altered to accommodate dimensions of different smart devices from the same or different manufacturers and could also be modified to accommodate different input and output buttons and other structures associated with the smart device and still function effectively according to this invention. While the smart device is shown as a smartphone S (FIG. 4) other smart devices including MP3 players and tablet computing devices could similarly be accommodated by this invention by having dimensions appropriately adjusted. While the slot 34 is shown in a smallest end side of the case 20, it is conceivable that the slot 34 could be in one of the longer sides 24 of the case 20 and still function according to this invention.

With particular reference to FIGS. 2-5, details of the insert 40 that can slide into and out of the case 20 are described according to this preferred embodiment. The insert 40 includes the tab 50 and sound amplification cone 70 hinged together by the hinge 60. This insert 40 is a separate structure from the case 20 but fits within the case 20 when in a stored position and is captured to the case 20 sufficiently so that the insert 40 is typically never entirely removed from the case 20.

The tab 50 defines a portion of the insert 40 which remains at least partially within the case 20 and secures the insert 40 to the case 20. This tab 50 has a thickness similar to that of the sound amplification cone 70 when in its collapsed form. The tab 50 has a width similar to a width of the smart device S and smartphone case 20, similar to a width of the slot 34 in the case 20. The tab 50 includes a post 52 extending laterally from each side thereof (with only one of the posts 52 shown due to the perspective provided in FIGS. 1-3). This post 52 and the tab 50 defines a wider portion of the tab 50 which cannot fit out of the slot 34, but rather abuts the stop 32 within the case 20 to keep the tab 50 from sliding entirely out of the case 20 (along arrow A of FIG. 1). As an alternative to the stop 32, the posts 52 could merely abut against portions of an end side of the case 20 provided by the slot 34 being as wide as all portions of the tab 50 except for the posts 52, so that the posts 52 cannot fit through the slot 34.

If desired, a small step or detent in the width of the tab can be provided at a midpoint thereof to allow the tab 50 to be either mostly slid out of the slot 34 or only partially slid out of the slot. If only partially slid out, the cone 70 has its inlet port 80 end directly adjacent the case 20.

A top surface 54 of the tab 50 faces upward and has at least a portion thereof located outside of the case 20 when the tab 50 has been slid out of the case 20 (FIG. 2). This tab 50 can optionally be fitted with speakers 100 (FIGS. 3 and 5) and can optionally be fitted with a battery 110 contained therein. Such speakers 100 would typically be provided as a pair in lateral sides of the tab 50 and on portions of the tab 50 which extend out of the case 20. These portions of the tab 50 are located adjacent the port 80 of the sound amplification cone 70 when the sound amplification cone 70 has been converted into its deployed form (along arrow B of FIG. 2) and rotated up into its final position (along arrow C of FIG. 3). Thus, sound from the speakers 100 can be amplified through the sound amplification cone 70 and be emitted out of the outlet 90 (along arrow D of FIG. 4).

In one embodiment, the tab 50 includes circuitry associated with the battery 110 and speakers 100 which also includes a receiver for receiving a sound signal from the smart device S (such as utilizing a Bluetooth transmission protocol) so that no wires are required extending between the tab 50 and the smart device S, but still allowing for sound from a smart device S to be played from the speakers 100. In one embodiment, the battery 110 and the tab 50 can be charged by having a plug which interfaces with the shelf 30 within the case 20 when the insert 40 is collapsed and stored within the case 20 by having the closest portion of the tab 50 abut the shelf 30 and close an electrical connection so that power can be transferred directly between the second battery 120 within the shelf 30 and the battery 110 within the tab 50 whenever the tab 50 is stored fully inside the case 20. As another alternative, a separate power port can be provided similar to the power port 110, but within the tab 50 for charging of the battery 110. Such charging can be from or to the smart device S by a power cord or from regular electric service at a wall outlet or other power outlet.

The tab 50 includes a hinge 60 at an outermost edge thereof which attaches the tab 50 to the sound amplification cone 70. This hinge 60 is preferably merely a thin flexible portion of the material forming the tab 50 and cone 70, sufficiently thin and flexible to facilitate ninety degrees of rotating of the sound amplification cone 70 relative to the tab 50. In this way, rotation (along arrow C of FIG. 3) is accommodated by the hinge 60.

The sound amplification cone 70 in the preferred embodiment has a rectangular form at both a smaller port 80 and at a larger outlet 90 on opposite ends of the sound amplification cone 70. The sound amplification cone 70 includes a front panel 72 opposite a rear panel 74 with side panels 76 joining the front panel 72 to the rear panel 74. Each of these panels 72, 74, 76 extend from the port 80 to the outlet 90.

The front panel 72 preferably includes an opening 73 at an end thereof adjacent the port 80. This opening 73 is sufficiently wide so that the sound ports 36 in the end of the case 20 and aligned with speakers of the smart device S can pass directly into an interior of the sound amplification cone 70.

A grip 78 is provided at an end of the front panel 72 or rear panel 74. This grip 78 extends slightly out of the case 20 even when the entire insert 40 is in the stored position within the case 20. A user can thus grasp the grip 78 and pull the entire insert 40 laterally (along arrow A) out of the case 20 (FIG. 1). The sound amplification cone 70 can then be converted from the storage configuration to the deployed configuration by movement of the front panel 72 away from the rear panel 74 (along arrow B of FIG. 2).

The side panels 76 preferably include a crease 77 extending between the port 80 and the outlet 90. This crease 77 bisects the side panels 76 and is located between the front panel 72 and the rear panel 74. The crease 77 adds sufficient flexibility to the side panels 76 so that they can transition between a folded form where portions of each side panel adjacent the crease are parallel and adjacent each other and an unfolded form where portions of the side panels 76 on opposite sides of the crease 77 are approximately co-planar. The creases 77 flex preferably inward so that a width of the sound amplification cone 70 does not exceed a width of the slot 74 when in the collapsed orientation. A thickness of the sound amplification cone 70 when in the collapsed orientation is similar to a thickness of the front panel 72 plus the rear panel 74 plus twice the thickness of the side panels 76. This thickness is preferably similar to that of the tab 50 so that the entire insert 40 has a common thickness. This thickness is also similar to the height of the slot 34 accommodating sliding of the insert 40 into and out of the case 20.

Figure 3:
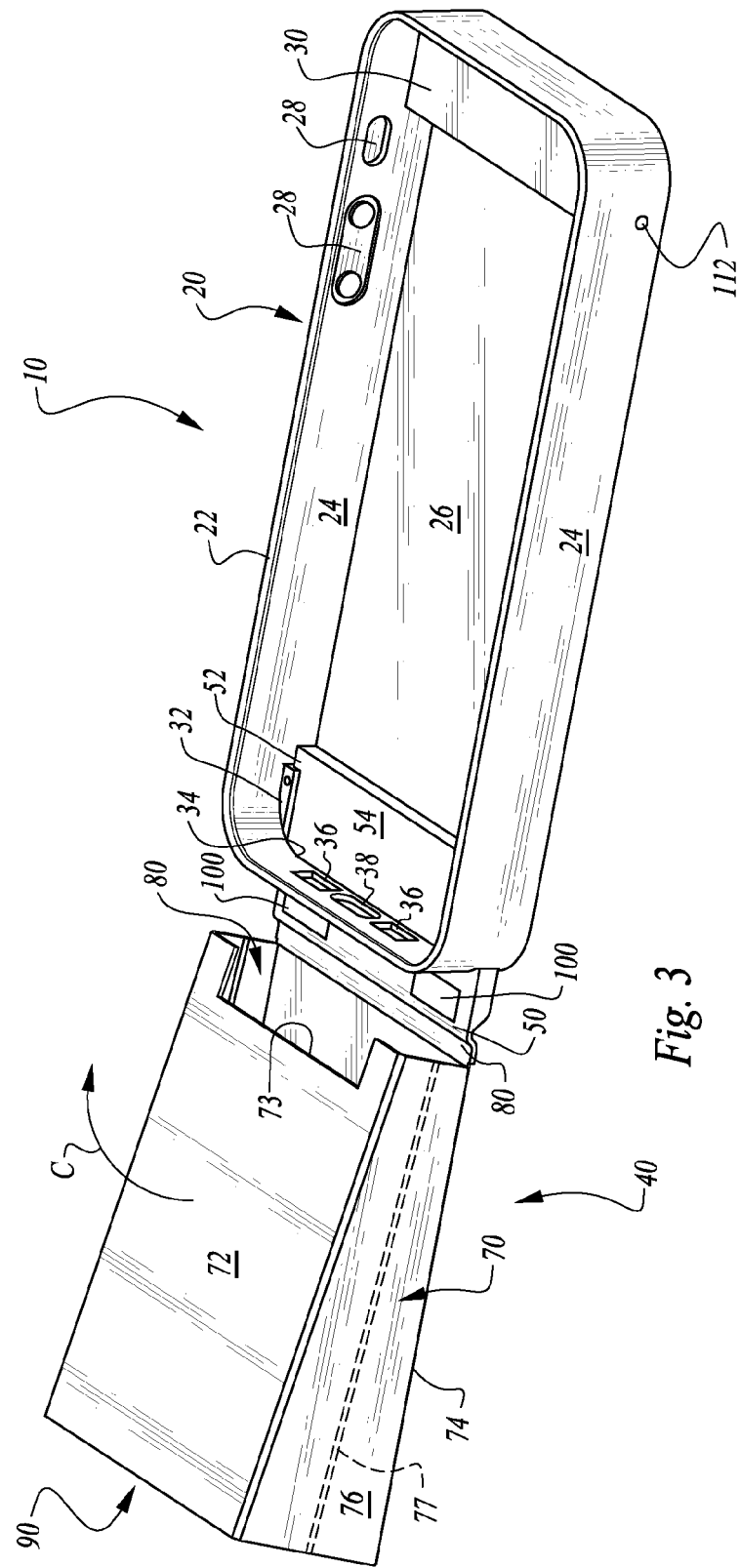
FIG. 3 is a perspective view similar to that which is shown in FIG. 2 but after the sound amplifying cone has been expanded from a collapsed form to a deployed form.
Figure 5:
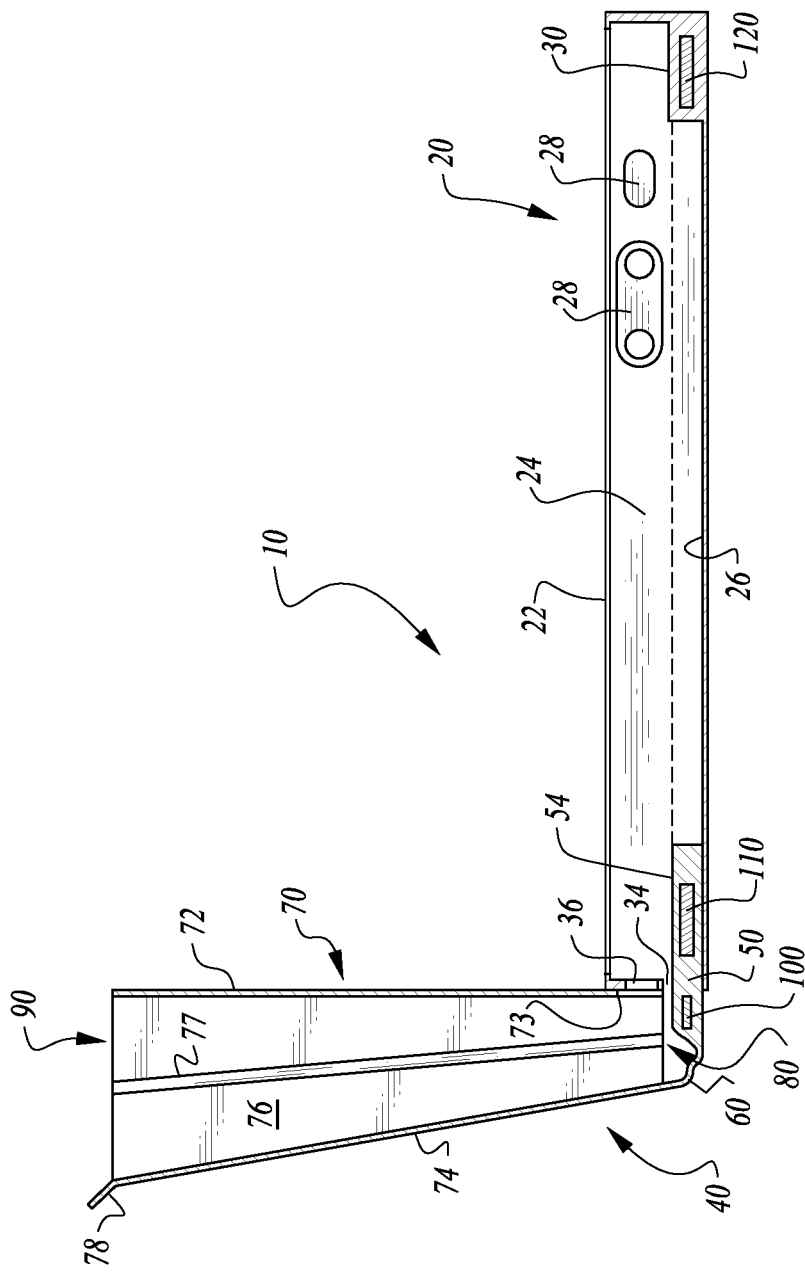
FIG. 5 is a full sectional side elevation view of that which is shown in FIG. 4, but with the smart phone removed from the case portion of the assembly.

While the primary methodology for utilizing the sound amplification cone 70 is shown in FIGS. 4 and 5 with the sound amplification cone 70 slid out of the case 20 and then expanded into its deployed form and then rotated into position adjacent an end of the smart device S within the case 20, other forms of utilization of the sound amplification cone 70 can also be employed. For instance, and as depicted in FIG. 3, the sound from the end of the smart device can merely pass into the port 80 while the sound amplification cone 70 is laying flat. If desired, the tab 50 can be slid partially into the case 20 so that the port 80 is directly adjacent the end of the case 20. If the side panels 76 are slightly folded, the entire assembly 10 including the smart device can conceivably be rotated so that the sound amplification cone 70 becomes a stand with the outlet 90 resting upon a horizontal surface with the case 20 extending up from the outlet 90 of the sound amplification cone 70. Similarly, the end of the case 20 adjacent the sound amplification cone 70 can conceivably be slid partially into the port 80 with a sufficient friction fit so that the case 20 and smart device can be held within the port 80 and the sound amplification cone 70 can act as a stand or otherwise merely remain attached to the end of the case 20 so that smart device amplification is provided within a more elongate form (FIG. 3) rather than in an angular form (FIG. 4).

While the outlet 90 is shown with edges of the panel 72, 74, 76 all coplanar, these edges could be scalloped or otherwise contoured either to provide decorative appearance or to allow for sound passage when the sound amplification cone 70 is being used as a stand for the case 20 and smart device S.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A smart device case with sound amplifier, comprising in combination:
   a case including sides extending up from a floor to a rim, said case configured to hold a smart device therein with a front of the smart device surrounded by said rim;
   a slot in one of said sides, said slot closer to said floor than to said rim;
   a sound amplifying cone having a width less than a width of said slot;
   said sound amplifying cone, when deployed, having an outlet larger than an inlet port and with said outlet on an end of said sound amplifying cone opposite said port; and
   said sound amplifying cone having a collapsed form with a thickness of said sound amplifying cone thinner than said slot, such that said sound amplifying cone can fit through said slot and into said case when in said collapsed form, said case having sufficient depth between said rim and said floor to house both said sound amplifying cone in said collapsed form and said smart device therein.

2. The combination of claim 1 wherein said sound amplifying cone has a height perpendicular to said width and perpendicular to said thickness which is less than a longest dimension of said case.

3. The combination of claim 2 wherein said sound amplifying cone has a font panel opposite a rear panel and with side panels joining said front panel to said rear panel, said front panel, said rear panel and said side panels each extending from said port to said outlet, said side panels having a crease therein configured to fold said side panels in half when said sound amplifying cone is in said collapsed form and to unfold said side panels when said sound amplifying cone is deployed.

4. The combination of claim 3 wherein said sound amplifying cone has a substantially rectangular cross-section at said port and at said outlet.

5. The combination of claim 4 wherein said sound amplifying cone has a portion of said rear panel adjacent said port hinged to a tab, said tab captured at least partially inside said case adjacent said slot.

6. The combination of claim 5 wherein said tab includes at least one post extending laterally therefrom, and wherein said case includes a stop spaced laterally to a side of said slot and in a common horizontal plane with said slot, said post defining a width of said tab greater than said slot with said post engaging said stop to prevent said tab from passing entirely out of said slot.

7. The combination of claim 5 wherein said front panel of said sound amplifying cone includes an opening adjacent said port, said opening configured to overlie speakers at an end of a smart device located within said case and above said slot in said case when said sound amplifying cone is pivoted about said hinge relative to said tab.

8. The combination of claim 5 wherein said tab includes auxiliary speakers therein.

9. The combination of claim 8 wherein a battery and power supply are coupled to said speakers in said tab with said power supply and said battery associated with said case.

10. The combination of claim 9 wherein a circuit associated with said speakers, said power supply and said battery is configured to receive a wireless signal from said smart device so that said smart device can transmit a sound file to said speakers for playing sound from said speakers in said tab.

11. A method for amplifying sound from a smart device, including the steps of:
   identifying a smart device case with sound amplifier having a case including sides extending up from a floor to a rim, the case configured to hold a smart device therein with a front of the smart device surrounded by the rim; a slot in one of the sides, the slot closer to the floor than to the rim; a sound amplifying cone having a width less than a width of the slot; the sound amplifying cone when deployed, having an outlet larger than an inlet port and with the outlet on an end of the sound amplifying cone opposite the inlet port; and the sound amplifying cone having a collapsed form with a thickness of the sound amplifying cone thinner than the slot, such that the sound amplifying cone can fit through the slot and into the case when in the collapsed form, the case having sufficient depth between the rim and the floor to house both the sound amplifying cone in the collapsed form and the smart device therein;

placing a smart device inside the case;
sliding the sound amplifying cone out of the slot; and
expanding the cone from the collapsed form to the deployed form.

12. The method of claim 11 including the further step of placing a port of the sound amplifying cone adjacent a speaker of the smart device for amplification of sound from the speaker through the sound amplifying cone.

13. The method of claim 11 including the further step of pivoting the cone and placing an opening in one end of the sound amplifying cone adjacent at least one speaker of the smart device.

14. The method of claim 11 including the further step of transmitting a signal from the smart device to auxiliary speakers in the sound amplifying cone and powering the auxiliary speakers to emit sound from the smart device.

15. The method of claim 14 wherein said powering step includes providing a battery electrically coupled to the auxiliary speakers and with a recharge port passing through the case and coupled to the battery for supplying electric power to recharge the battery through the recharge port.

16. A smart device sound amplifier, comprising in combination:
    a sound amplifying cone having a collapsed form and a deployed form;
    said sound amplifying cone having a pair of planar opposite panels including a front panel and a rear panel;
    said sound amplifying cone having opposing side panels;
    said sound amplifying cone having said front panel and said rear panel closer together when in the collapsed form than when in the deployed form; and
    said sound amplifying cone having an open port opposite an open outlet with said front panel, said rear panel and said side panels extending from said port to said outlet.

17. The amplifier of claim 16 wherein said outlet is larger than said port, and wherein a cross-section of said outlet and a cross-section of said port are each substantially rectangular.

18. The amplifier of claim 16 wherein said front panel includes an opening therein adjacent said port, said opening sized to allow speakers of a smart device to be oriented so that sound from the speakers passes through the opening when the opening is placed adjacent an end of the smart device having speakers therein.

19. The amplifier of claim 16 wherein said side panels are creased from said port to said outlet, said creases allowing said side panels to bend between a folded form with portions of the side panels on either side of the crease parallel with each other and a deployed form with portions of the side panels on opposite sides of said crease in an orientation closer to coplanar than parallel.

20. The amplifier of claim 19 wherein a case is provided sized to receive the smart device therein, the case including sides extending up from a floor to a rim, the case configured to hold the smart device therein with a front of the smart device surrounded by the rim, a slot in one of said sides, said slot closer to said floor than to said rim, said sound amplifying cone having a portion of said rear panel adjacent said port hinged to a tab, said tab captured at least partially inside said case adjacent said slot.

* * * * *